United States Patent
Narendran et al.

(10) Patent No.: US 8,818,290 B1
(45) Date of Patent: Aug. 26, 2014

(54) DYNAMICALLY ADAPTING A RECEIVE DIVERSITY MODE OF A BASE STATION

(75) Inventors: Rajveen Narendran, Olathe, KS (US); Jerry Michael Johnson, Platte City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 203 days.

(21) Appl. No.: 13/566,014

(22) Filed: Aug. 3, 2012

(51) Int. Cl.
*H04B 17/00* (2006.01)

(52) U.S. Cl.
USPC .... 455/67.11; 455/63.1; 455/101; 455/67.13; 455/452.1; 455/524; 455/562.1; 455/114.2; 370/329; 370/341; 370/335; 370/342; 375/144; 375/299; 375/346

(58) Field of Classification Search
USPC ............... 455/67.11, 101, 524, 63.1, 67.13, 455/452.1, 562.1, 296, 114.2
See application file for complete search history.

(56) References Cited

U.S. PATENT DOCUMENTS

| | | | |
|---|---|---|---|
| 7,925,302 B2 * | 4/2011 | Ulupinar et al. | 455/562.1 |
| 8,160,648 B2 * | 4/2012 | Ulupinar et al. | 455/562.1 |
| 2005/0197080 A1 * | 9/2005 | Ulupinar et al. | 455/135 |
| 2010/0210235 A1 * | 8/2010 | Ulupinar et al. | 455/278.1 |
| 2013/0225094 A1 * | 8/2013 | Mujtaba et al. | 455/73 |
| 2013/0288624 A1 * | 10/2013 | Mujtaba et al. | 455/140 |

* cited by examiner

*Primary Examiner* — Marceau Milord

(57) ABSTRACT

The usage capacity of a base station operating in four-branch receive diversity mode is limited to a given number of channel resources, where each channel resource corresponds to an active user. In two-branch receive diversity mode, approximately twice as many channel resources are available, but the receiver sensitivity is less than with four-branch mode. Thus, four-branch mode provides better coverage but with less usage capacity. A base station is operated in four-branch mode to provide the best coverage while usage is low. When the number of users reaches a first threshold, prior to reaching the maximum number of users, the base station transitions to two-branch mode to accommodate an anticipated increase of users above the four-branch capacity, although with reduced coverage. When usage then falls below a second threshold, the base station transitions back to four-branch mode, again providing better coverage.

20 Claims, 8 Drawing Sheets

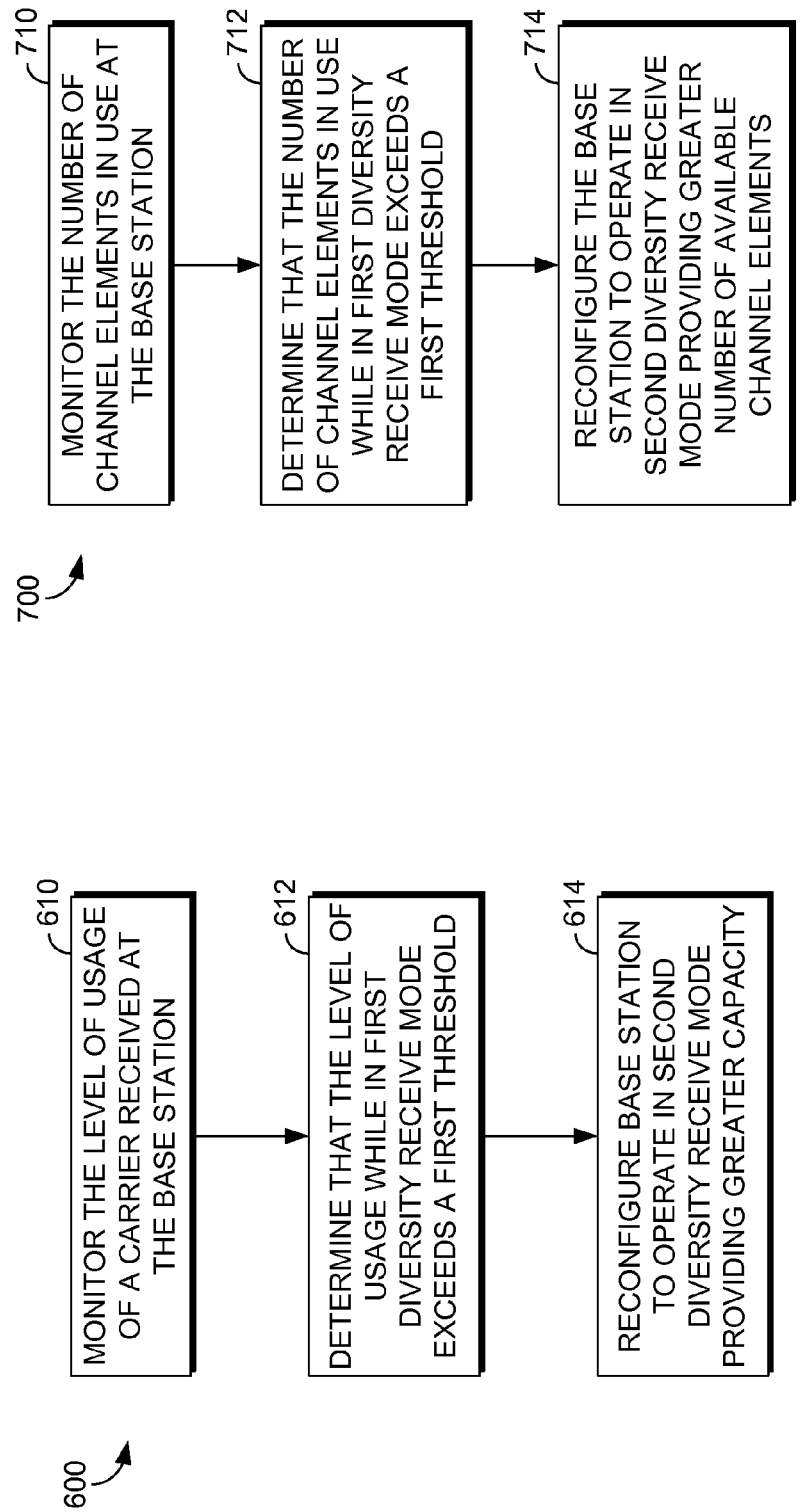

DYNAMICALLY ADAPTING A RECEIVE DIVERSITY MODE OF A BASE STATION

SUMMARY

A high-level overview of various aspects of the invention is given here to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. In brief and at a high level, this disclosure describes, among other things, ways to dynamically adapt an amount of carrier capacity of a base station in a wireless communications network based on the use of different receive diversity modes.

In a first aspect, computer-readable media are provided for performing a method of dynamically adapting a receive diversity mode of a base station in a wireless communications network. The method includes monitoring a level of usage of a carrier that is received by the base station. The base station is configurable to operate in a first receive diversity mode that provides a given amount of carrier capacity and a second receive diversity mode that provides a greater amount of carrier capacity than the first receive diversity mode. When the base station is operating in the first receive diversity mode, a determination is made that the level of usage has exceeded a threshold that is less than or equal to the given amount of carrier capacity of the first receive diversity mode. Upon the level of usage exceeding the first threshold, the base station is reconfigured to operate in the second receive diversity mode that provides the greater amount of carrier capacity.

In a second aspect, computer-readable media are provided for performing a method of dynamically selecting between a first receive diversity mode and a second receive diversity mode of a base station in a wireless communications network. The method includes monitoring a number of channel elements in use for a carrier that is received by the base station. The base station is reconfigurable to switch between the first receive diversity mode, which provides greater receiver sensitivity than the second receive diversity mode, and the second receive diversity mode, which provides a greater number of available channel elements than the first receive diversity mode. When the base station is operating in the first receive diversity mode, a determination is made that the number of channel elements in use has exceeded a threshold. Upon making the determination, the base station is reconfigured to operate in the second receive diversity mode that provides the greater number of available channel elements at a lesser receiver sensitivity than the first receive diversity mode.

In a third aspect, computer-readable media are provided for performing a method of dynamically adapting an amount of carrier capacity of a base station in a wireless communications network. The method includes monitoring a level of channel element usage for a carrier that is received by the base station. The base station is operable to switch between a four-branch receive diversity mode and a two-branch receive diversity mode. The four-branch receive diversity mode provides a greater amount of receiver sensitivity than the two-branch receive diversity mode, and the two-branch diversity mode provides a greater amount of carrier capacity than the four-branch receive diversity mode. When the base station is operating in the four-branch receive diversity mode, a determination is made that the level of channel element usage has exceeded a first usage threshold. Upon making the determination, the base station is configured to operate in the two-branch receive diversity mode that provides the greater carrier capacity at a lesser receiver sensitivity.

BRIEF DESCRIPTION OF THE SEVERAL VIEWS OF THE DRAWINGS

Illustrative embodiments of the present invention are described in detail below with reference to the attached drawing figures, and wherein:

FIG. 6 depicts an illustrative method for dynamically adapting a receive diversity mode of a base station in accordance with an embodiment of the present invention;

FIG. 7 depicts an illustrative method for dynamically selecting between a first receive diversity mode and a second receive diversity mode of a base station in accordance with an embodiment of the present invention;

DETAILED DESCRIPTION

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

BS Base Station
BSC Base Station Controller
CDMA Code Division Multiple Access
CE Channel Element
EMS Element Management System
EVDO Evolution-Data Optimized
GIS Geographic Information Systems GPRS General Packet Radio Service
GSM Global System for Mobile Communications
PDA Personal Data Assistant
TDMA Time Division Multiple Access Further, various technical terms are used throughout this description. An illustrative resource that fleshes out various aspects of these terms can be found in Newton's Telecom Dictionary, 26th Edition (2011).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media include media implemented in any method or technology for storing information readable by a computing device. Examples of stored information include program modules including instructions, data structures, other data representations, and the like. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
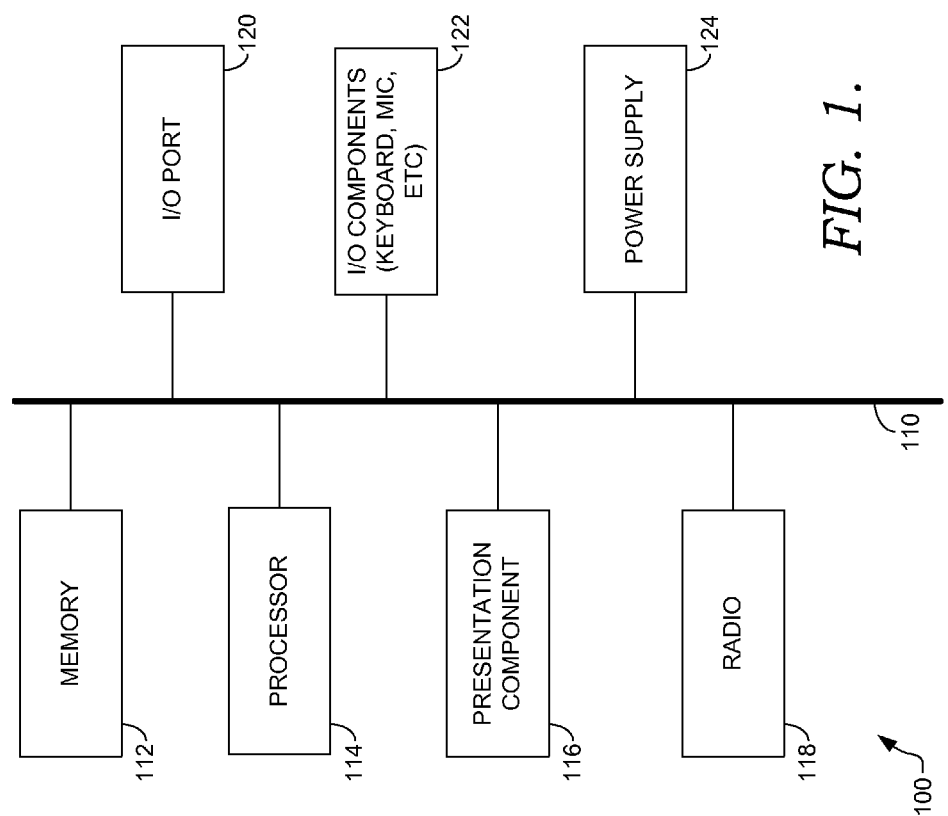
FIG. 1 depicts a block diagram of an illustrative mobile computing device in accordance with an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 118, input/output ports 120, input/output components 122, and a power supply 124.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 118 represents a radio that facilitates communication with a wireless telecommunications network. Illustrative wireless telecommunications technologies include CDMA, GPRS, TDMA, GSM, EVDO, and the like. In some embodiments, radio 118 might also facilitate other types of wireless communications including Wi-Fi communications and GIS communications.

Input/output port 120 might take on a variety of forms. Illustrative input/output ports include a USB jack, stereo jack, infrared port, proprietary communications ports, and the like. Input/output components 122 include items such as keyboards, microphones, touch screens, and any other item usable to directly or indirectly input data into mobile device 100. Power supply 124 includes items such as batteries, fuel cells, or any other component that can act as a power source to power mobile device 100.

Figure 2:
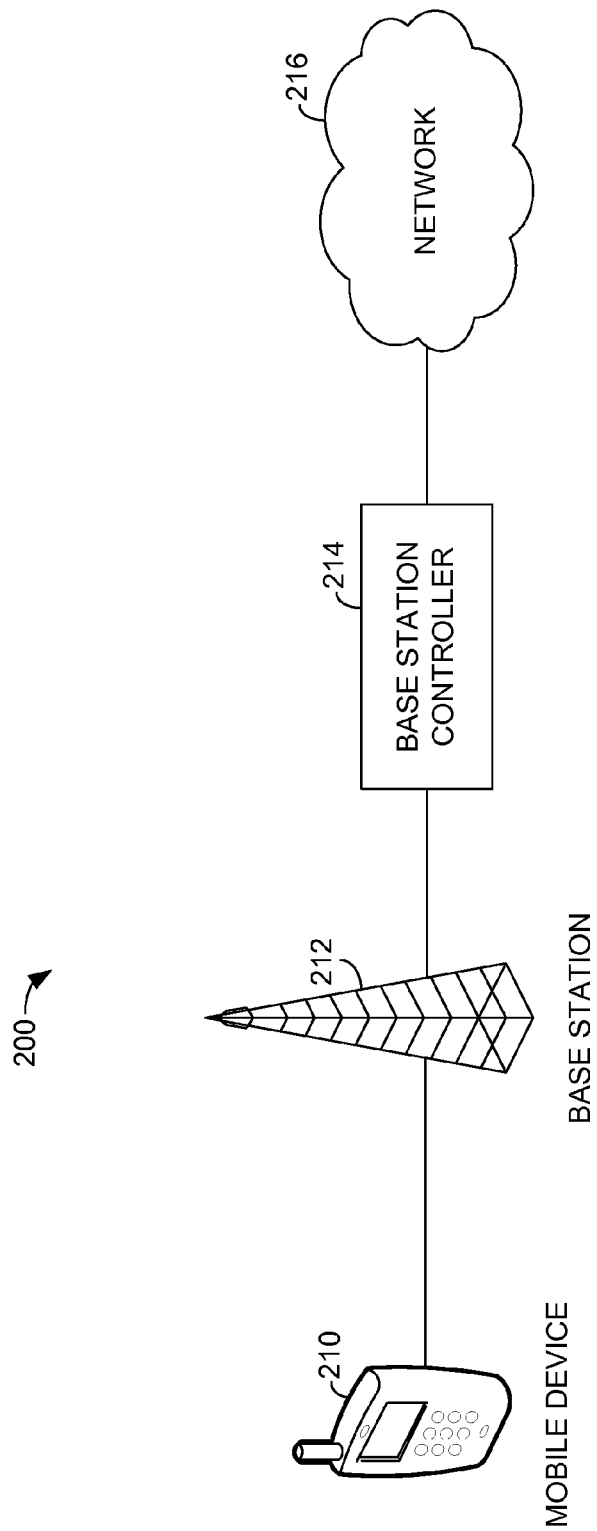
FIG. 2 depicts a diagram of an illustrative network environment in accordance with an embodiment of the present invention.

Referring now to FIG. 2, an illustrative network environment suitable for use in accordance with an embodiment of the invention is depicted and is generally referred to as network environment 200. Network environment 200 is but one example of a suitable network environment, and includes a mobile device 210, a base station (BS) 212, a base station controller (BSC) 214, and a network 216. Although elements of network environment 200 are shown in the singular, elements of network environment 200 may be plural. For example, network environment 200 may include multiple mobile devices and BSs.

An exemplary mobile device 210 includes a cell phone. Other examples of mobile device 210 include personal digital assistants (PDAs), wireless-enabled laptop computers, gaming systems, electronic books, and other devices as described above regarding mobile device 100 of FIG. 1 that are capable of connecting with BS 212.

BS 212 enables mobile device 210 to communicate with network 216, and may include a tower, one or more antennas, and one or more radio receivers. In some cases, BS 212 may not include an actual tower; for example, antennas may be mounted on top of buildings or other structures, or in other locations, in lieu of being mounted on a tower. By way of example, third-generation cellular technologies, such as Code Division Multiple Access-Evolution-Data Optimized (CDMA-EVDO) could be used to connect mobile device 210 to BS 212. IEEE 802.11 wireless links could also be used to connect mobile device 210 to BS 212. However, BS 212 is not limited to those particular technologies.

BS 212 is controlled by BSC 214, which handles allocation of radio channels, receives measurements from mobile devices, and controls handovers of mobile devices from one BS to another. A BSC typically manages multiple BSs such as BS 212.

An exemplary BS 212 employs a technique referred to as receive diversity, or antenna diversity, to minimize the effects of multipath interference on a signal received from mobile device 210. Multipath interference occurs when multiple versions of the signal destructively interfere with each other at the receiving antenna, as described more fully below.

By using multiple antennas, better reception of a signal may be obtained. For example, two antennas placed at a distance from each other will receive different versions of a signal transmitted by a mobile device. The signals received at each antenna may be combined or selected using various techniques to minimize the effects of the interference observed at each antenna.

Examples of receive diversity include two-branch receive diversity and four-branch receive diversity. When operating in two-branch receive diversity mode, a BS combines signals from two antennas and receivers. When operating in four-branch receive diversity mode, a BS combines signals from four antennas and receivers. Greater numbers of antennas may be utilized, although as the number of branches increases, so does the amount of resources required to process the greater number of signals.

Figure 3:
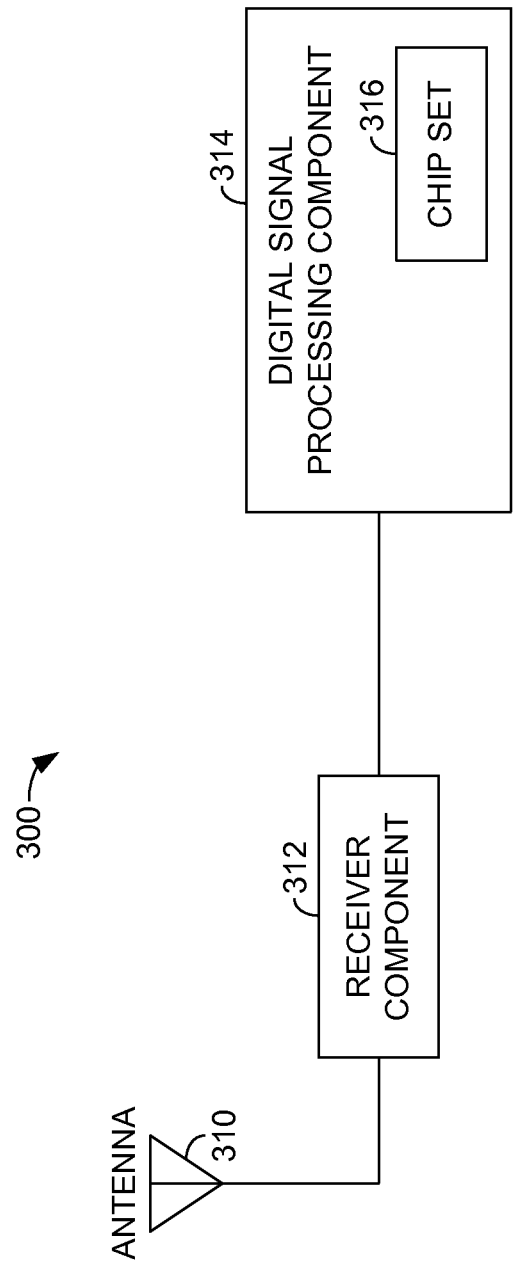
FIG. 3 depicts a block diagram of an illustrative base station in accordance with an embodiment of the present invention.

Referring now to FIG. 3, a block diagram of an illustrative BS 300 is depicted. FIG. 3 will be discussed with reference to FIG. 2. BS 300 functions as described above with regard to BS 212, and includes an antenna 310, a receiver component 312, and a digital signal processing component 314, which includes a chip set 316. Although elements of BS 300 are shown in the singular, elements of BS 300 may be plural. For example, antenna 310 may include a plurality of antennas. Antenna 310 receives a signal from a mobile device, such as mobile device 210. Receiver component 312, which includes one or more receivers, demodulates the received signal. Chip set 316 receives the demodulated signal from receiver component 312 and provides digital processing to further decode the signal.

In an embodiment, receiver component 312 and chip set 316 are configurable to operate in either two-branch receive diversity mode or four-branch receive diversity mode. As described above, in two-branch receive diversity mode, two antennas and receivers are used to receive a single carrier, whereas in four-branch receive diversity mode, four antennas and receivers are used to receive a single carrier. Four-branch mode provides better sensitivity, or reception, than two-branch mode, thus providing better coverage, but there is a trade off in terms of the number of users that can be serviced, as described more fully below.

Chip set 316 has a certain amount or capacity of resources, which may be expressed as a number of channel elements (CEs), for supporting connections with access terminals such as, for example, mobile device 210. A single CE provides the resources to support a connection with one access terminal. In one embodiment, a chip set 316 utilizing EVDO technology has a capacity of 284 CEs. In two-branch mode, 284 connections can be supported. In four-branch mode, however, only 142 CEs are available because a portion of the chip set's resources are utilized to make up the two additional branches. Thus, while four-branch mode is desirable for providing better coverage, it reduces the number of available CEs as compared to two-branch mode. Each of the two modes offers advantages and disadvantages, which are described more fully below.

In technologies other than EVDO, the term "channel element" may have a different connotation than in EVDO, or other terms may be used to refer to the resources required to support a connection with an access terminal. In this document, the term "channel element" is understood to include similar or analogous functionality (i.e., providing resources to support a connection with one access terminal) regardless of the specific technology, and is not intended to limit the scope of the present invention to EVDO technology.

Figure 4:
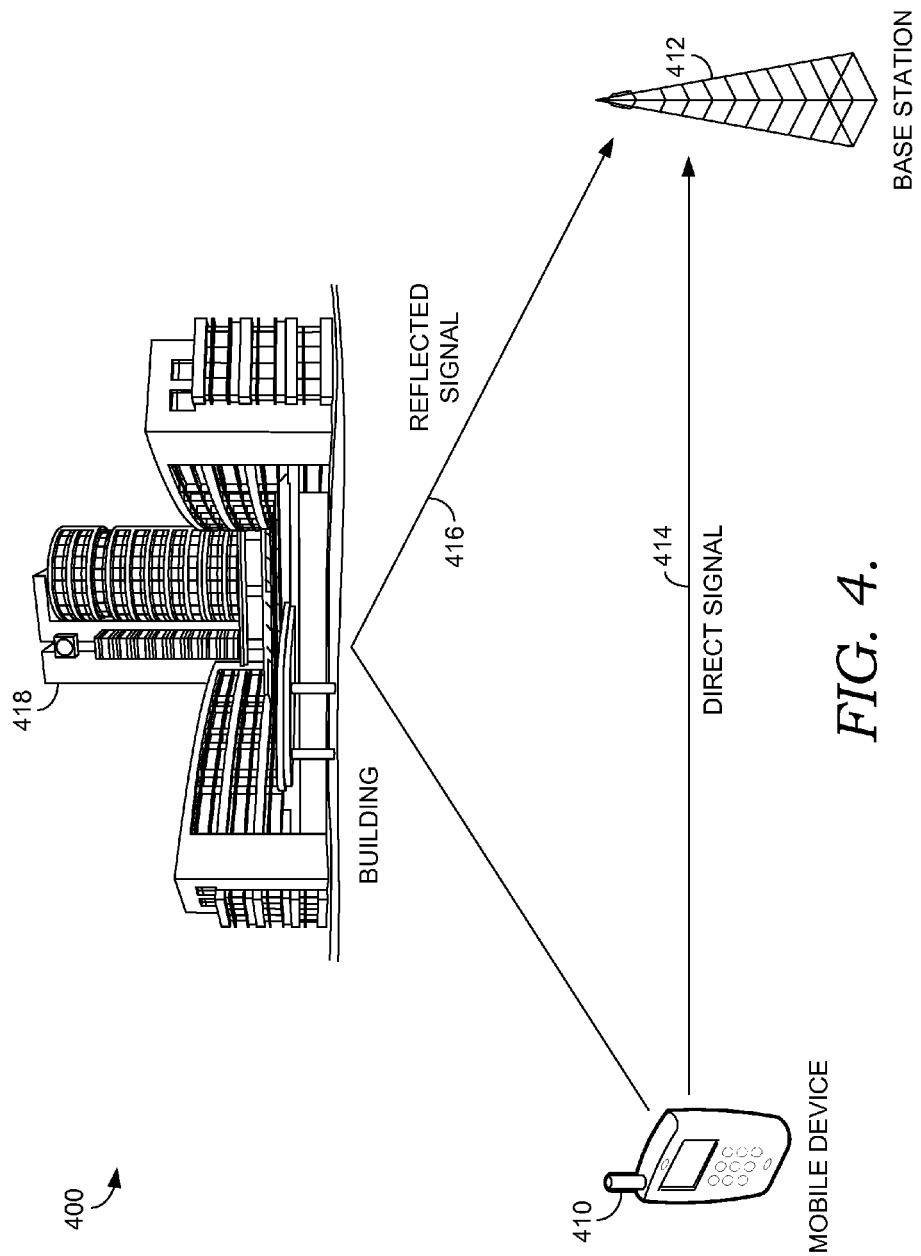
FIG. 4 depicts a diagram of an illustrative operating environment portraying communication between a mobile device and a base station in accordance with an embodiment of the present invention.

Referring now to FIG. 4, an illustrative operating environment portraying communication between a mobile device and a BS is depicted and is generally referred to as operating environment 400. FIG. 4 will be described with reference to FIGS. 2 and 3. Operating environment 400 includes a mobile device 410, a BS 412, a direct signal 414, a reflected signal 416, and a building 418. Although elements of operating environment 400 are shown in the singular, elements of operating environment 400 may be plural. For example, mobile device 410 may include a plurality of mobile devices, and building 418 may include a plurality of buildings.

Mobile device 410 includes devices such as mobile device 210 described above. Mobile device 410 transmits a signal to be received at BS 412. The signal may be received by BS 412 in a direct line of sight, depicted as direct signal 414. Additionally, the signal transmitted by mobile device 410 may be received at BS 412 after having reflected off of an object in operating environment 400, as depicted by reflected signal 416. Reflected signal 416 is reflecting off of building 418; however, the signal may reflect off of any number of types of objects, such as geographical features, vehicles, and other natural or artificial objects. The signal may also reflect off of a plurality of objects prior to being received at BS 412. Further, depending on the makeup of operating environment 400, BS 412 may receive one or more reflected signals without receiving a direct signal.

In an embodiment, BS 412 is a BS such as BS 300 described above with regard to FIG. 3, and includes a chip set such as chip set 316. As described above, in an embodiment receiver component 312 and chip set 316 are configurable to operate in two-branch receive diversity mode and four-branch receive diversity mode. As mobile device 410 moves through operating environment 400, the signal received at BS 412 from mobile device 410 may fluctuate greatly in amplitude and/or phase because multiple, diverse versions of the signal (e.g., direct signal 414 and reflected signal 416) arrive at BS 412. Such fluctuation is referred to as multipath interference. A single antenna located at BS 412 would receive a signal that is basically a summation or combination of direct signal 414 and reflected signal 416. In an embodiment, BS 412 compensates for multipath interference by utilizing two or more antennas positioned at a distance from each other, in a manner described below with regard to FIG. 5.

Figure 5:
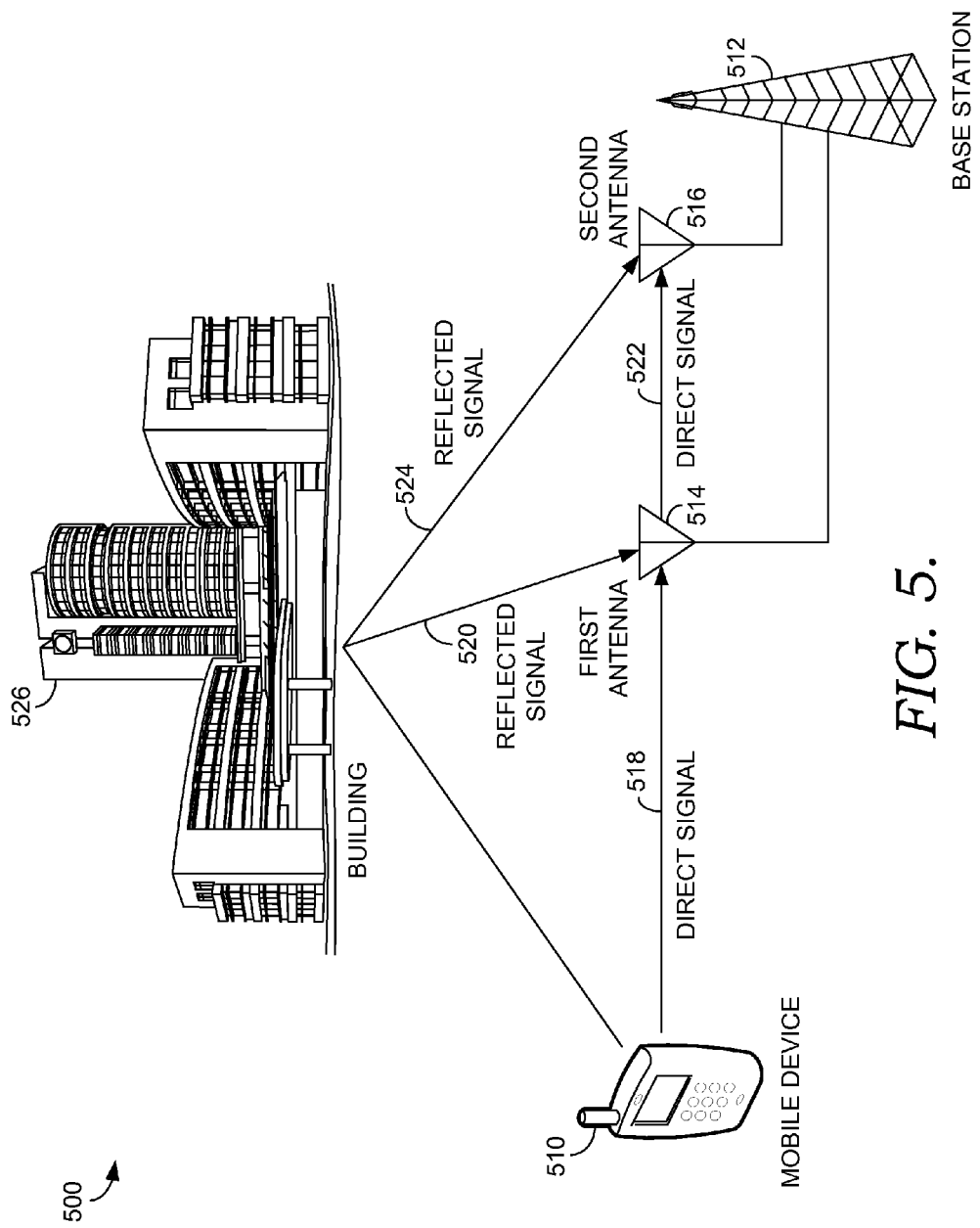
FIG. 5 depicts a diagram of another illustrative operating environment portraying communication between a mobile device and a base station in accordance with an embodiment of the present invention.

Referring now to FIG. 5, an illustrative operating environment portraying communication between a mobile device and a BS is depicted and is generally referred to as operating environment 500. FIG. 5 is described with reference to FIGS. 2 and 3. Operating environment 500 includes a mobile device 510, a BS 512, a first antenna 514, a second antenna 516, a direct signal 518, a reflected signal 520, a direct signal 522, a reflected signal 524, and a building 526. Mobile device 510 includes devices such as mobile device 210 described above. Mobile device 510 transmits a signal to be received at BS 512. BS 512 includes BSs such as BS 212 described above. In an embodiment, BS 512 utilizes both the first antenna 514 and the second antenna 516 to receive the signal from mobile device 510. As illustrated, the first antenna 514 receives the direct signal 518 and the reflected signal 520, whereas the second antenna 516 receives the direct signal 522 and the reflected signal 524. Each of the received signals 518, 520, 522, and 524 is different from the other signals. For example, even though signals 518 and 522 are received as direct signals, they are out of phase with each other because the direct signal 522 is received by the second antenna 516 at a slightly later time than the direct signal 518 is received by the first antenna 514.

Thus, the first antenna 514 receives a resultant signal that is a summation, or combination, of the direct signal 518 and the reflected signal 520. Similarly, the second antenna 516 receives a resultant signal that is a summation, or combination, of the direct signal 522 and the reflected signal 524. Accordingly, the resultant signal at each of the two antennas is different from that received at the other antenna.

By utilizing two antennas at BS 512, with the antennas positioned at a distance from each other, as depicted in FIG. 5, the differing resultant signals from mobile device 510 received at each antenna can be combined into a single signal by processing that is performed within a receiver component and a chip set (such as receiver component 312 and chip set 316 of FIG. 3) at BS 512, such that interference and distortion can be reduced, effectively improving the reception or gain of the signal from mobile device 510. Various techniques and algorithms known to one of ordinary skill in the art are available for combining signals to take advantage of receive diversity. Advantages and disadvantages of utilizing two branches versus four branches in receive diversity mode are described below without regard to the particular method utilized to combine the multiple signals.

In one embodiment, BS 512 includes four antennas (antennas 514, 516, and two additional antennas not shown). The receiver component and chip set associated with BS 512 may be configured such that the four antennas are utilized to receive signals from mobile device 510 in four-branch mode. Additionally, the receiver component and chip set may be configured such that two antennas (antennas 514 and 516) are utilized to receive signals from mobile device 510 in two-branch mode, and may also be reconfigured to switch between two-branch mode and four-branch mode.

Four-branch mode provides better reception than two-branch mode. In a typical case, one might expect to see an improvement of 2-3 dB in four-branch mode as compared with two-branch mode, depending on the nature of operating environment 500. There is a disadvantage, however, to operating a BS in four-branch mode as compared to two-branch mode. Operating in four-branch mode requires more of the chip set's resources per connection, so the chip set's CE capacity is reduced. In one embodiment, whereas an EVDO chip set operating in two-branch mode has a capacity of 284 CEs, in four-branch mode the EVDO chip set has a capacity of only 142 CEs. Thus, four-branch mode provides better reception than two-branch mode, whereas in two-branch mode the chip set can support a greater amount of traffic (i.e., connections) than in four-branch mode.

Operating in either two-branch mode or four-branch mode impacts the values of access parameters that mobile devices utilize to establish a connection with the BS. The BS transmits the access parameters over a control channel that is accessible by mobile devices attempting to connect with the BS. The access parameters specify aspects of an access probe (i.e., connection request) sent from the mobile device to the BS to initiate an access attempt. In one embodiment utilizing an EVDO technology, a mobile device sends a sequence of access probes. Exemplary access parameters include the initial power level of the access probe, the power level of a subsequent access probe if there is no response to the first probe, and how soon after the first access probe a subsequent access probe should be sent. Because there is potentially a large number of access terminals sending access probes to the BS, it is desirable for the access probes to be transmitted at the lowest possible power level to minimize the noise floor of the carrier. The noise floor is a level of signal which a particular mobile device has to exceed to be heard by a BS, and is a function of the sum of all the noise sources and signals within the receiver, including access probes received from mobile devices.

Because a BS operating in four-branch mode has greater receiver sensitivity than in two-branch mode, the access probes can be transmitted by mobile devices at a lower power level to that BS, than to a BS utilizing two-branch mode. Accordingly, in one embodiment, a BS operating in four-branch mode would transmit access parameters that specify the lower level of probe power. Likewise, a BS operating in two-branch mode may transmit access parameters specifying a higher access probe power level appropriate for two-branch mode. Thus, the access parameters may be adapted for the particular receive diversity mode currently utilized by the BS.

Access probe power level is but one example of an access parameter that might vary depending on whether a BS is operating in four-branch or two-branch mode. Other parameters may vary as well, and may depend on the particular communication technology utilized by a BS. For one embodiment utilizing an EVDO technology, exemplary access parameters are described in Table 1. The inclusion of Table 1 is not intended to imply that all of the access parameters listed will necessarily vary between two-branch mode and four-branch mode in an embodiment. Additionally, more or fewer access parameters than those listed in Table 1 may be transmitted by a BS in some embodiments.

TABLE 1

EXEMPLARY EVDO ACCESS PARAMETERS

| | | |
|---|---|---|
| Probe Sequence Max | PROBE_SEQUENCE_MAX | Maximum number of access probe sequences for a single access attempt. |
| Probe Backoff | PROBE_BACKOFF | Backoff value the mobile station (MS) uses between access probes. |
| Probe Sequence Backoff | PROBE_SEQUENCE_BACKOFF | Backoff value the MS uses between access probe sequences. |
| Probe Initial Adjust | PROBE_INITIAL_ADJUST | Correction factor which terminals use for estimating open loop power in case of access channel initial transmission (1 dB) |
| Number of Steps for Probes | PROBE_NUM_STEP | Maximum access probe count which terminal sends in access probe sequence |
| Power Step Size for Probes | POWER_STEP | Access probe power increase step (0.5 dB) |
| Probe Time Out Adjust | PROBE_TIME_OUT_ADJUST | Time correction value to transmit the access probe |

One aspect of the traffic handled by a given BS is that the level of traffic varies throughout the day, i.e., some hours during the day are busier than others. The term "busy hour" refers to the period of each day (or each week, month, or year) when the BS handles its greatest volume of traffic. The term "bouncing busy hour" is also sometimes used because the busiest hour typically varies depending on the day of the week. The busy hour may also vary depending on other factors that affect network usage, such as during a holiday.

If the volume of traffic reaches the BS's capacity, then call blocking occurs when a mobile device attempts to connect with the BS and there are no more resources available to support the connection (i.e., all CEs are in use). For example, if chip set 316 of FIG. 3 is operating in two-branch mode, with a capacity of 284 CEs, and 284 connections are in use, then chip set 316 does not have resources available to support a 285th connection. Likewise, if chip set 316 is operating in 4-branch mode, with a capacity of 142 CEs, and 142 connections are in use, then chip set 316 does not have resources available to support a 143rd connection. In either case, additional mobile devices attempting to connect with the BS would be blocked.

The most likely time for call blocking to occur is during the busy hour, when the level of traffic is at its peak. Thus, although utilizing four-branch mode to provide the best possible reception of mobile devices is desirable, and may provide adequate CE capacity most of the time for a particular BS, the BS's CE capacity may be exceeded during the busy hour, resulting in call blocking, which is not desirable.

One approach to obtaining the advantages of four-branch mode without resulting in excessive call blocking is to configure some BSs to operate in four branch mode all of the time, and others to operate in two-branch mode all of the time, based on each BS's anticipated level of traffic during its busy hour. For example, assume BS 512 includes an EVDO chip set that supports 284 CEs in two-branch mode and 142 CEs in four-branch mode. BS 512 may typically handle 100 or fewer connections most of the time, but increase to 200 connections during its busy hour. In that case, because four-branch mode only supports a maximum of 142 connections, one could configure BS 512 to operate in two-branch mode all of the time so that no call blocking would occur during the busy hour. As another example, assume BS 512 includes the same chip set, but typically handles 50 or fewer connections most of the time, and increases to only 100 connections during its busy hour. In this case, one could configure BS 512 to operate in four-branch mode all of the time because the anticipated busy-hour level of traffic does not exceed the maximum number of connections supported in four-branch mode. Thus, using the approach illustrated by the two foregoing examples, one could at least realize the advantages of utilizing four-branch mode with a BS that is not anticipated to exceed the capacity of four-branch mode, although not with a BS that is anticipated to exceed the capacity of four-branch mode.

Referring now to FIG. 6, an illustrative method for dynamically adapting a receive diversity mode of a BS in a wireless communications network ("network") in accordance with an embodiment of the present invention is depicted, and is generally referred to as method 600. One or more of the steps and tasks represented in FIG. 6 may be embodied on computer-readable media, which is readable by a computing device to carry out the step or task. Although the steps and tasks depicted in FIG. 6 are described in an order, the steps may not necessarily be carried out in the same order in which they are described.

At a step 610, a level of usage by access terminals is monitored for a carrier that is received by the BS. The BS is configurable to operate in a first receive diversity mode ("first mode") and a second receive diversity mode ("second mode"), such that the first mode provides a given amount of carrier capacity of the BS and the second mode provides a greater amount of carrier capacity of the BS than the first mode. In one embodiment, the first mode is four-branch mode and the second mode is two-branch mode, although other receive diversity modes utilizing different numbers of antennas and branches may be employed.

In one embodiment, the level of usage of the carrier is monitored by monitoring the number of CEs in use. An element management system (EMS) may monitor various operational parameters of a BS and collect statistics. One of the operational parameters gathered by the EMS may be the number of CEs in use.

In another embodiment, the level of usage of the carrier is monitored by monitoring the reverse channel noise of the carrier. (The term "reverse channel" refers to communication from a mobile device to a BS. Communication from the BS to the mobile device is referred to as "forward channel.") Reverse channel noise is another operational parameter that the EMS may gather. As described above, the noise floor of a signal is a function of the sum of all the noise sources and signals within the receiver, including communications received from mobile devices. As the number of access terminals utilizing the carrier increases, the reverse channel noise also increases and is thus an indirect measurement of the level of usage of the carrier by access terminals.

At a step 612, while the BS is operating in the first mode, a determination is made that the level of usage has reached or exceeded a first threshold that is less than or equal to the given amount of carrier capacity of the first mode. Reaching or exceeding the first threshold indicates that the level of usage is approaching or has reached the usage capacity of the first mode. Were the level of usage to reach the usage capacity of the first mode, call blocking would occur if additional connections were attempted by access terminals.

At a step 614, when the level of usage reaches or exceeds the first threshold, the BS is reconfigured to operate in the second mode that provides the greater amount of carrier capacity. In an embodiment, the BS is reconfigured from four-branch mode to two-branch mode. As such, some amount of receiver sensitivity will be sacrificed, but the use of two-branch mode will accommodate a greater level of traffic than four-branch mode.

In an embodiment, the level of usage is monitored periodically at a particular interval which may be predetermined based on operating characteristics of the BS and how rapidly the level of usage is anticipated to rise or fall. The shorter the interval, the more quickly the reconfiguration of the BS can begin once the first threshold has been reached or exceeded. Some BSs may require more time to be reconfigured than others. Either or both of the interval at which the level of usage is monitored, and the level of the first threshold, may be selected to minimize the likelihood that call blocking will occur before the BS has been reconfigured to operate in the second mode. The interval and level of usage may also be selected such that the BS remains in four-branch mode, thus providing better reception, as long as possible.

In an embodiment, in addition to monitoring operational parameters, the EMS provides access to the BS's configurable parameters. For example, the thresholds associated with transitioning from four-branch mode to two branch mode, and vice versa, are accessed and may be modified manually by way of the BS's EMS. The EMS may also monitor the level of usage and the occurrence of call blocking, and automatically adjust the level of one or both thresholds to ensure that the BS transitions between receive diversity modes at an appropriate time such that call blocking does not occur, or at least that the likelihood of call blocking is minimized.

Referring now to FIG. 7, an exemplary method for dynamically selecting between a first receive diversity mode and a second receive diversity mode of a BS in a wireless communications network ("network") in accordance with an embodiment of the present invention is depicted, and is generally referred to as method 700. One or more of the steps and tasks represented in FIG. 7 may be embodied on computer-readable media, which is readable by a computing device to carry out the step or task. Although the steps and tasks depicted in FIG. 7 are described in an order, the steps may not necessarily be carried out in the same order in which they are described.

At a step 710, a number of channel elements in use for a carrier that is received by the BS is monitored. The BS is reconfigurable to switch between the first receive diversity mode ("first mode") and the second receive diversity mode ("second mode"). The first mode provides greater receiver sensitivity than the second mode, and the second mode provides a greater number of available channel elements than the first mode. For example, in one embodiment the first mode is four-branch mode, which provides greater receiver sensitivity than two-branch mode, and the second mode is two-branch mode, which provides a greater number of available channel elements than four-branch mode.

At a step 712, while the BS is operating in the first mode, a determination is made that the number of channel elements in use has exceeded a first threshold. This may occur, for instance, during the BS's busy hour when the number of users increases.

At a step 714, upon determining that the number of channel elements in use has exceeded the first threshold, the BS is reconfigured to operate in the second mode that provides the greater number of available channel elements at a lesser receiver sensitivity than the first mode. In one embodiment, the BS is reconfigured from four-branch mode to two-branch mode. As such, the use of two-branch mode will accommodate a greater level of traffic than four-branch mode, although the level of receiver sensitivity will decrease.

Figure 8:
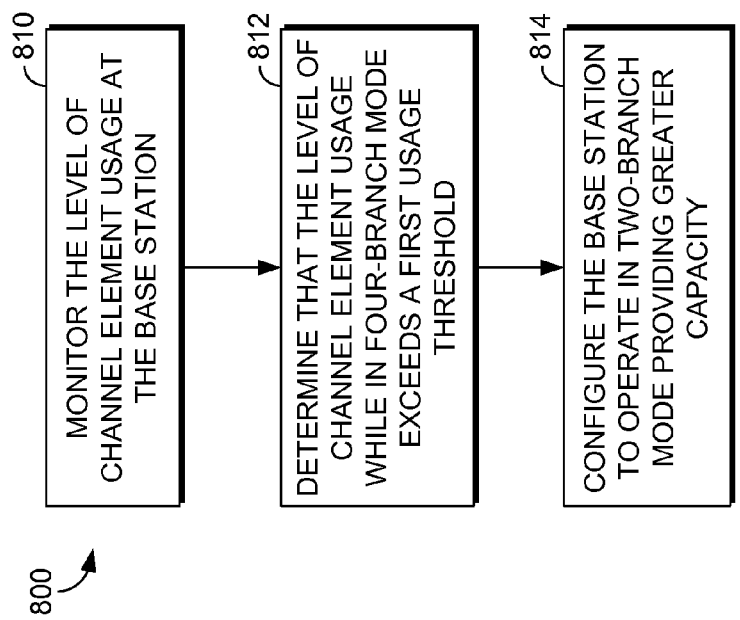
FIG. 8 depicts an illustrative method for dynamically adapting an amount of carrier capacity of a base station in accordance with an embodiment of the present invention.

Referring now to FIG. 8, an exemplary method for dynamically adapting an amount of carrier capacity of a BS in a wireless communications network ("network") in accordance with an embodiment of the present invention is depicted, and is generally referred to as method 800. One or more of the steps and tasks represented in FIG. 8 may be embodied on computer-readable media, which is readable by a computing device to carry out the step or task. Although the steps and tasks depicted in FIG. 8 are described in an order, the steps may not necessarily be carried out in the same order in which they are described.

At a step 810, a level of CE usage is monitored for a carrier that is received by the BS, which can be configured to switch between a four-branch receive diversity mode ("four-branch mode") and a two-branch receive diversity mode ("two-branch mode"). The four-branch mode provides a greater amount of receiver sensitivity ("greater sensitivity") than the two-branch mode, and the two-branch mode provides a greater amount of carrier capacity ("greater capacity") than the four-branch mode. The carrier capacity may be described as a total number of CEs that are available for use by access terminals in a given receive diversity mode.

At a step 812, while the BS is operating in the four-branch mode, a determination is made that the level of CE usage has exceeded a first usage threshold. The first usage threshold may be selected or predefined to be less than the carrier capacity of four-branch mode, such that the first usage threshold would be exceeded before the carrier capacity is exceeded.

At a step 814, upon having determined that the level of CE usage has exceeded the first usage threshold, the BS is configured to operate in the two-branch mode that provides the greater capacity at a lesser receiver sensitivity. The level of the first usage threshold may be selected such that, once the threshold has been exceeded, there is enough time to reconfigure the BS before the level of CE usage exceeds the carrier capacity of four-branch mode. Thus, by switching the BS to two-branch mode, although there is a reduction of receiver sensitivity, the likelihood of call blocking is reduced because of the greater carrier capacity of two-branch mode.

Figure 9:
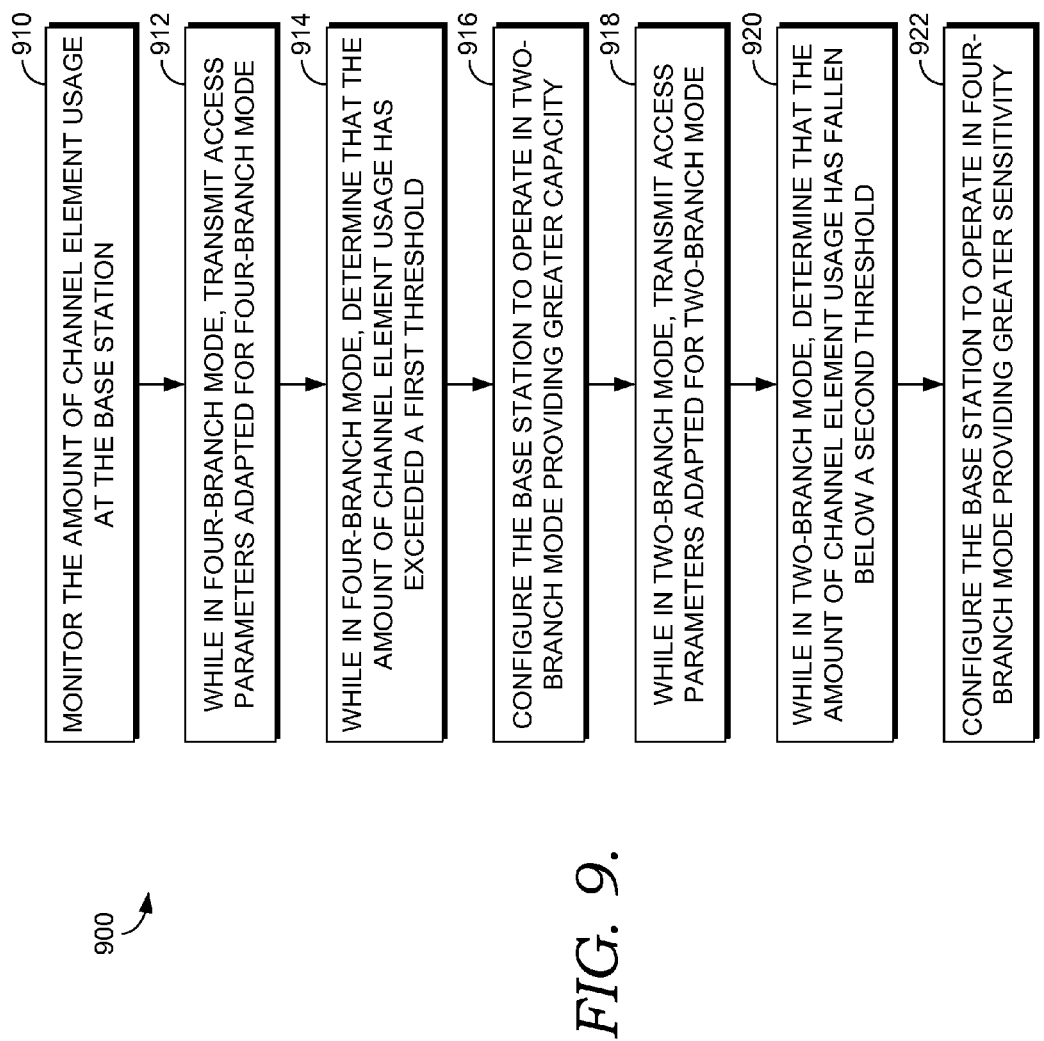
FIG. 9 depicts another illustrative method for dynamically adapting an amount of carrier capacity of a base station in accordance with an embodiment of the present invention.

Referring now to FIG. 9, an illustrative method for dynamically adapting an amount of carrier capacity of a BS in a wireless communications network ("network") in accordance with an embodiment of the present invention is depicted, and is generally referred to as method 900. One or more of the steps and tasks represented in FIG. 9 may be embodied on computer-readable media, which is readable by a computing device to carry out the step or task. Although the steps and tasks depicted in FIG. 9 are described in an order, the steps may not necessarily be carried out in the same order in which they are described.

At a step 910, a level of CE usage is monitored for a carrier that is received by the BS. In an embodiment, the BS utilizes an EVDO telecommunications technology, including an EVDO chip set that processes signals received by the BS from mobile devices. The EVDO chip set and the BS's receivers can be configured to operate in either four-branch receive diversity mode ("four-branch mode") or two-branch receive diversity mode ("two-branch mode"). As described above, four-branch mode provides a greater amount of receiver sensitivity ("greater sensitivity") by combining signals received by four antennas, but provides a lesser carrier capacity (i.e., number of available CEs) than two-branch mode; thus, the two-branch mode provides a greater amount of carrier capacity ("greater capacity") and a lesser receiver sensitivity ("lesser sensitivity") than four-branch mode.

At a step 912, while the BS is operating in the four-branch mode, the BS transmits access parameters adapted for four-branch mode. The access parameters are receivable by mobile devices attempting to access the network, and specify parameters of access probes transmitted by the mobile devices to the BS. The access parameters adapted for four-branch mode enable the mobile devices to initiate a connection with the BS when the BS is operating in the four-branch mode.

At a step 914, while the BS is operating in the four-branch mode, a determination is made that the level of CE usage has exceeded a first usage threshold.

At a step 916, upon having determined that the level of CE usage has exceeded the first usage threshold, the BS is configured to operate in two-branch mode that provides greater capacity at lesser sensitivity. The value of the first threshold is predetermined such that when the BS is in the four-branch mode, the BS transitions to the two-branch mode before the number of mobile devices attempting to access the network exceeds the lesser capacity of the four-branch mode. The greater capacity of two-branch mode reduces the likelihood that call blocking will occur.

At a step 918, while the BS is operating in two-branch mode, the BS transmits a second set of access parameters adapted for two-branch mode. As with the first set of access parameters, the second set of access parameters specifies parameters of access probes transmitted by mobile devices attempting to access the network, but the access parameters adapted for two-branch mode are different from the access parameters adapted for four-branch mode.

At a step 920, while the BS is operating in two-branch mode, a determination is made that the level of CE usage has fallen below a second usage threshold that is less than or equal to the first usage threshold.

At a step 922, upon having determined that the level of CE usage has fallen below the second usage threshold, the BS is reconfigured to operate in the four-branch mode that provides the greater sensitivity and the lesser capacity than the second mode. In an embodiment, the second usage threshold is predetermined such that when the BS is in the two-branch mode, the BS transitions to the four-branch mode when the greater capacity of the two-branch mode is no longer required, thus providing better reception of the mobile devices that are currently connected with the BS.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Nontransitory computer-readable media having computer-executable instructions embodied thereon that, when executed, perform a method of dynamically adapting a receive diversity mode of a base station in a wireless communications network (network), the method comprising:

monitoring a level of usage of a carrier that is received by the base station, wherein the base station is configurable to operate in a first receive diversity mode (first mode) and a second receive diversity mode (second mode), wherein the first mode provides a given amount of carrier capacity and the second mode provides a greater amount of carrier capacity than the first mode;

when the base station is operating in the first mode, determining that the level of usage has reached a first threshold that is less than or equal to the given amount of carrier capacity of the first mode; and upon the level of usage reaching the first threshold, reconfiguring the base station to operate in the second mode that provides the greater amount of carrier capacity.

2. The nontransitory computer-readable media of claim 1, wherein the method further comprises:

when the base station is operating in the second mode, determining that the level of usage has decreased to a second threshold that is less than or equal to the first threshold; and upon the level of usage decreasing to the second threshold, reconfiguring the base station to operate in the first mode that provides the given amount of carrier capacity.

3. The nontransitory computer-readable media of claim 1, wherein the first mode is a four-branch receive diversity mode and the second mode is a two-branch receive diversity mode.

4. The nontransitory computer-readable media of claim 1, wherein the first mode provides greater receiver sensitivity than the second mode, while providing the given amount of carrier capacity, and wherein the second mode provides the greater amount of carrier capacity enabling more users to access the carrier, while providing less receiver sensitivity than the first mode.

5. The nontransitory computer-readable media of claim 1, wherein monitoring the level of usage includes monitoring a number of users accessing the carrier.

6. The nontransitory computer-readable media of claim 1, wherein monitoring the level of usage includes monitoring a level of reverse channel noise associated with the carrier.

7. The nontransitory computer-readable media of claim 1, wherein the method further comprises:

when the base station is operating in the first mode, transmitting a first set of access parameters usable by mobile devices to access the network, wherein the first set of access parameters is adapted for use with the first mode; and when the base station is operating in the second mode, transmitting a second set of access parameters usable by the mobile devices to access the network, wherein the second set of access parameters is adapted for use with the second mode.

8. The nontransitory computer-readable media of claim 1, wherein the method further comprises:

determining a value for the first threshold such that when the base station is in the first mode, the base station transitions to the second mode before the level of usage exceeds the given amount of carrier capacity provided by the first mode.

9. The nontransitory computer-readable media of claim 1, wherein the base station utilizes an evolution-data optimized (EVDO) technology.

10. Nontransitory computer-readable media having computer-executable instructions embodied thereon that, when executed, perform a method of dynamically selecting between a first receive diversity mode and a second receive diversity mode of a base station in a wireless communications network (network), the method comprising:

monitoring a number of channel elements in use for a carrier that is received by the base station, wherein the base station is reconfigurable to switch between the first receive diversity mode (first mode) and the second receive diversity mode (second mode), wherein the first mode provides greater receiver sensitivity than the second mode, and wherein the second mode provides a greater number of available channel elements than the first mode;

when the base station is operating in the first mode, determining that the number of channel elements in use has exceeded a first threshold; and upon determining that the number of channel elements in use has exceeded the first threshold, reconfiguring the base station to operate in the second mode that provides the greater number of available channel elements at a lesser receiver sensitivity than the first mode.

11. The nontransitory computer-readable media of claim 10, wherein the base station utilizes an evolution-data optimized (EVDO) technology.

12. The nontransitory computer-readable media of claim 10, wherein the method further comprises:

when the base station is operating in the second mode, determining that the number of channel elements has fallen below a second threshold that is less than or equal to the first threshold; and upon determining that the number of channel elements has fallen below the second threshold, reconfiguring the base station to operate in the first mode that provides the greater receiver sensitivity and a fewer number of available channel elements than the second mode.

13. The nontransitory computer-readable media of claim 10, wherein the method further comprises:

utilizing a value for the first threshold such that when the base station is in the first mode, the base station transitions to the second mode before a number of access terminals attempting to access the network exceeds the number of available channel elements associated with the first mode.

14. The nontransitory computer-readable media of claim 10, wherein the method further comprises:

when the base station is operating in the first mode, transmitting access probe parameters associated with the first mode, receivable by access terminals attempting to access the network, wherein the access probe parameters associated with the first mode enable the access terminals to connect with the base station when the base station is operating in the first mode; and when the base station is operating in the second mode, transmitting access probe parameters required for the second mode, receivable by the access terminals attempting to access the network, wherein the access probe parameters required for the second mode enable the access terminals to connect with the base station when the base station is operating in the second mode.

15. Nontransitory computer-readable media having computer-executable instructions embodied thereon that, when executed, perform a method of dynamically adapting an amount of carrier capacity of a base station in a wireless communications network (network), the method comprising:

monitoring a level of channel element usage for a carrier that is received by the base station, wherein the base station is operable to switch between a four-branch receive diversity mode (four-branch mode) and a two-branch receive diversity mode (two-branch mode), wherein the four-branch mode provides a greater amount of receiver sensitivity (greater sensitivity) than the two-branch mode, and wherein the two-branch mode provides a greater amount of carrier capacity (greater capacity) than the four-branch mode;

when the base station is operating in the four-branch mode, determining that the level of channel element usage has exceeded a first usage threshold; and upon determining that the level of channel element usage has exceeded the first usage threshold, configuring the base station to operate in the two-branch mode that provides the greater capacity at a lesser receiver sensitivity.

16. The nontransitory computer-readable media of claim 15, wherein the method further comprises:

when the base station is operating in the four-branch mode, transmitting access parameters adapted for the four-branch mode, receivable by mobile devices attempting to access the network, wherein the access parameters adapted for the four-branch mode enable the mobile devices to connect with the base station when the base station is operating in the four-branch mode; and when the base station is operating in the two-branch mode, transmitting access parameters adapted for the two-branch mode, receivable by the mobile devices attempting to access the network, wherein the access parameters adapted for the two-branch mode enable the mobile devices to connect with the base station when the base station is operating in the two-branch mode.

17. The nontransitory computer-readable media of claim 16, wherein the access parameters adapted for the four-branch mode are different from the access parameters adapted for the two-branch mode.

18. The nontransitory computer-readable media of claim 15, wherein the method further comprises:

when the base station is operating in the two-branch mode, determining that the level of channel element usage has fallen below a second usage threshold that is less than or equal to the first usage threshold; and upon determining that the level of channel element usage has fallen below the second usage threshold, reconfiguring the base station to operate in the first mode that provides the greater sensitivity and a lesser capacity than the second mode.

19. The nontransitory computer-readable media of claim 18, wherein the base station utilizes an evolution-data optimized (EVDO) technology.

20. The nontransitory computer-readable media of claim 15, wherein the method further comprises:

utilizing a value for the first threshold such that when the base station is in the four-branch mode, the base station transitions to the two-branch mode before a number of mobile devices attempting to access the network exceeds the lesser capacity associated with the first mode.

* * * * *